United States Patent [19]

Haruyama et al.

[11] Patent Number: 4,811,338

[45] Date of Patent: Mar. 7, 1989

[54] SYSTEM FOR ADJUSTING SIGNAL TRANSMISSION TIMING TO PREVENT SIGNAL COLLISIONS

[75] Inventors: Hideaki Haruyama, Yokohama; Hiroshi Kobayashi, Tokyo, both of Japan

[73] Assignee: Kabushiki Kaisha Toshiba, Kawasaki, Japan

[21] Appl. No.: 205,033

[22] Filed: Jun. 2, 1988

Related U.S. Application Data

[63] Continuation of Ser. No. 36,459, Apr. 9, 1987, abandoned.

[30] Foreign Application Priority Data

Apr. 14, 1986 [JP] Japan .................................. 61-85524

[51] Int. Cl.$^4$ ............................................... H04J 3/02
[52] U.S. Cl. ...................................................... 370/85
[58] Field of Search ...................... 370/13, 67, 85, 14, 370/94; 340/825.5

[56] References Cited

U.S. PATENT DOCUMENTS

| | | | |
|---|---|---|---|
| 4,594,705 | 6/1986 | Yahata et al. | 370/67 |
| 4,694,453 | 9/1987 | Kobayashi et al. | 370/85 |
| 4,773,065 | 9/1988 | Kobayashi et al. | 370/67 |

OTHER PUBLICATIONS

Digest of Paper 82, 24th IEEE Computer Society International Conference, CableNet: a local area network reservation scheme,: Kong et al., Feb. 22-25, 1982.

Primary Examiner—Douglas W. Olms
Attorney, Agent, or Firm—Oblon, Fisher, Spivak, McClelland & Maier

[57] ABSTRACT

In a communication network system, a central equipment unit transmits, over a down link, a frame signal carrying subframe information signals addressed to respective terminal equipment units, on a time-division multiplexing basis. The frame signal consists of a delay measurement window field carrying address information designating one of the terminal equipment units for delay measurement and a data field carrying the subframe information signals addressed to the terminal equipment units. When a terminal equipment unit is polled from the central equipment unit to measure the delay time, it transmits a response signal to the central equipment unit after a predetermined time interval from the reception timing of the frame signal, such that the response signal arrives at the central equipment unit within the delay measurement window field of the next frame signal. The central equipment unit measures a delay time between the transmission timing of the next frame signal and the reception timing of the response signal, and transmits transmission timing adjustment information based on the measured delay time, and address information of the terminal equipment unit, in an address field of the next frame signal. The terminal equipment unit transmits a subframe signal to the central equipment unit after a time interval, depending on the transmission timing adjustment information, from the reception timing of a frame signal.

10 Claims, 8 Drawing Sheets

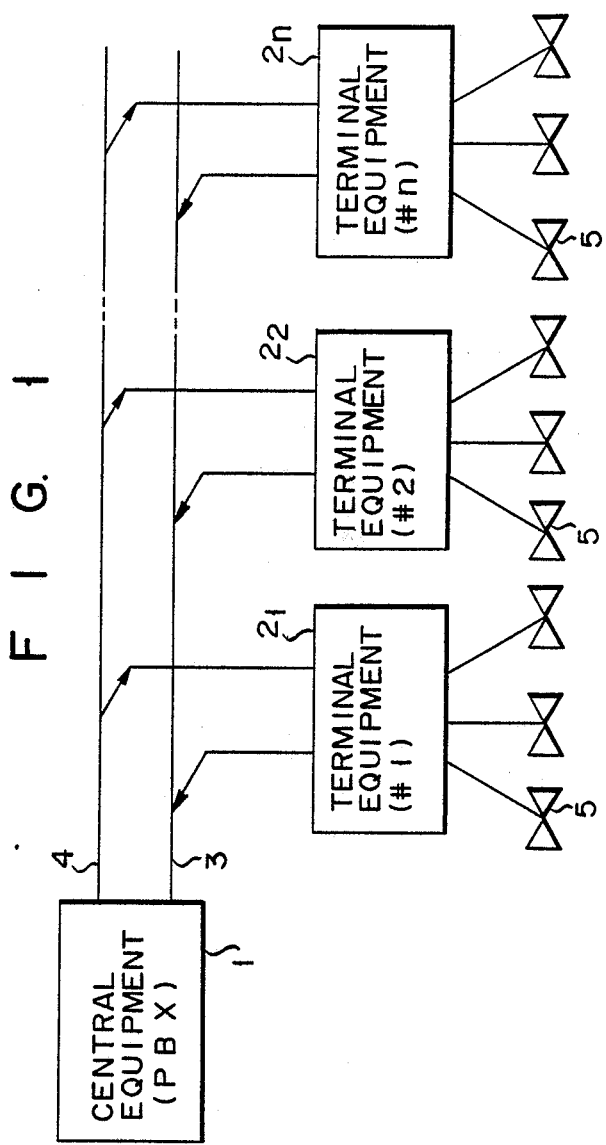

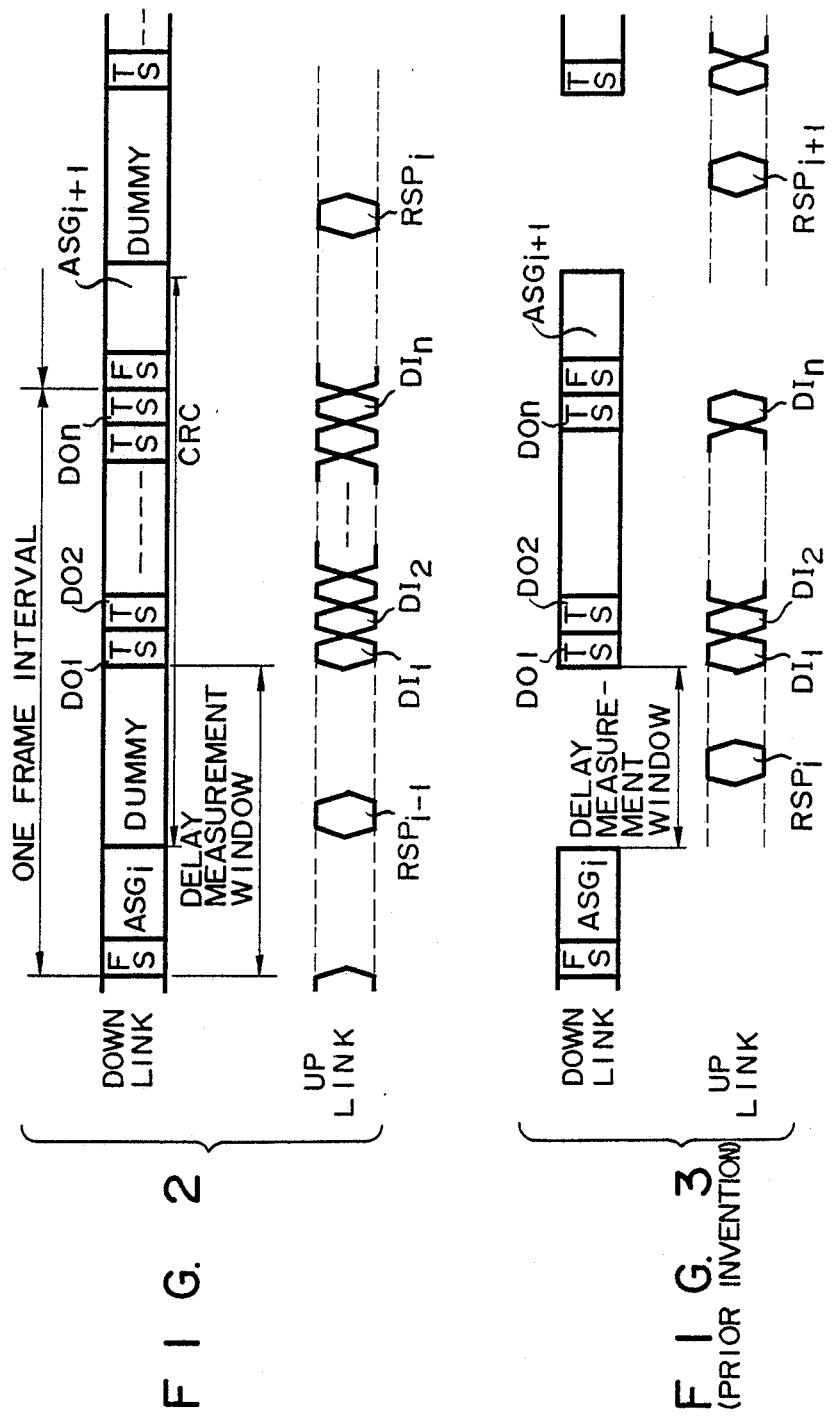

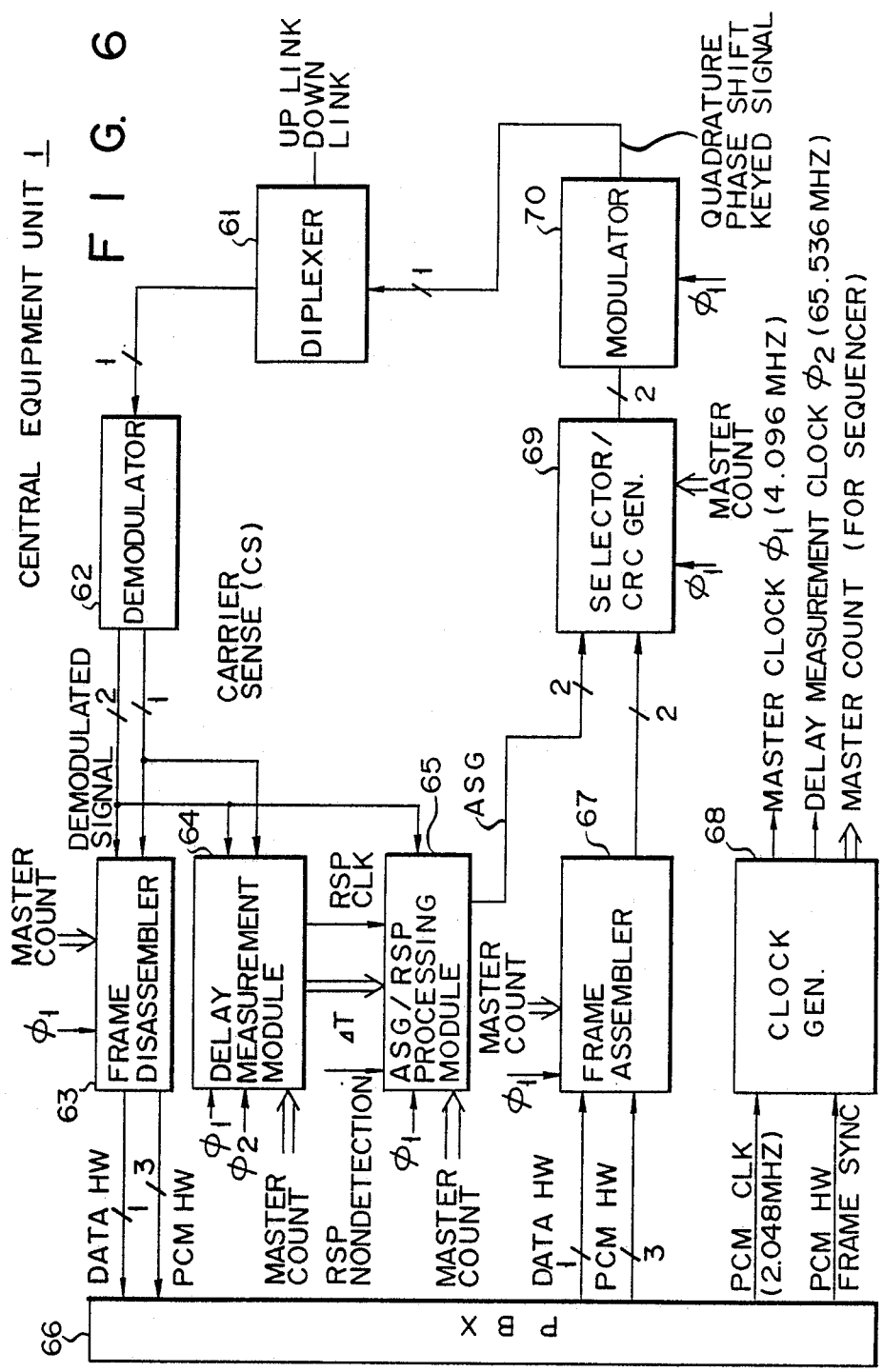

4,811,338

SYSTEM FOR ADJUSTING SIGNAL TRANSMISSION TIMING TO PREVENT SIGNAL COLLISIONS

This application is a continuation of application Ser. No. 36,459, filed on Apr. 9, 1987, now abandoned.

BACKGROUND OF THE INVENTION

The present invention relates to a signal transmission system in a communication network system wherein one central equipment unit and a plurality of terminal equipment units are connected via a signal transmission line and, more particularly, to a system for adjusting a signal transmission timing at each terminal equipment unit, for the purpose of preventing signal collisions on the signal transmission line.

A communication network is known, which is constructed such that a terminal equipment unit having concentration and distribution functions is installed in a building or at a floor of the building, at least one terminal device such as a telephone set is connected to the terminal equipment unit, and a plurality of such terminal equipment units are coupled to a central equipment unit such as a PBX (private branch exchange) via an up link and a down link.

In such a network, the terminal equipment units are connected at different positions along the signal transmission line. For this reason, the signal propagation times (transmission delay times) between the respective terminal equipment units and the central equipment unit differ from each other. In order to transmit signals on a time-division multiplexing basis from a plurality of terminal equipment units to the central unit via the common transmission line, it is very important to prevent collisions, on the signal transmission line, of signals transmitted from the terminal equipment units. In order to prevent the signal collisions, it is necessary to adjust the signal transmission timings of the terminal equipment units, taking the different transmission delay times thereof into consideration. However, simply setting time margins for signal transmissions while taking into consideration the different transmission delay times of the terminal equipment units would considerably reduce the utility efficiency of the transmission line.

U.S. Pat. No. 4,594,705, issued June 10, 1986; entitled "BUS-CONFIGURED LOCAL AREA NETWORK WITH DATA EXCHANGE CAPABILITY"; and assigned to the same assignee as this application, discloses a system or adjusting a signal transmission timing of a terminal equipment unit. This system operates in a test mode, a transmission-start timing setting mode, and a normal data transmission mode. In the test mode, a central equipment unit transmits test signals addressed to the terminal equipment units, and each terminal equipment unit transmits a response signal to the central equipment unit, in response to the reception of the test signal addressed to itself. The central equipment unit measures a delay time between the transmission timing of the test signal and the reception timing of the response signal transmitted from the terminal equipment unit. In the transmission-start timing setting mode, the central equipment unit transmits control data based on the measured delay time to each terminal equipment unit. In the transmission mode, each terminal equipment unit transmits a data signal to the central equipment unit at a timing based on the control data transmitted from the central equipment unit.

According to the system, since the delay time measurement mode and the data transmission mode are provided independently from each other, if an additional terminal equipment unit is connected to the network, it is difficult to measure a transmission delay time between the additional terminal equipment unit and the central equipment unit. In other words, the delay time between the additional terminal equipment unit and the central equipment unit must be measured when the existing terminal equipment units are not busy.

U.S. Pat. No. 4,694,453 issued Sept. 15, 1987, entitled "SYSTEM FOR ADJUSTING SIGNAL TRANSMISSION TIMING IN TIME-DIVISION MULTIPLEXING SIGNAL TRANSMISSION", and assigned to the same assignee as this application, discloses a time-division multiplexing communication network in which each terminal equipment unit measures a transmission delay time between the central equipment unit and itself, so as to adjust the timing for a signal transmission to the central equipment unit.

According to the transmission system disclosed in this patent, the central equipment unit requests each terminal equipment unit to transmit a test signal, and the terminal equipment unit requested to do so, transmits the test signal. The central equipment unit sends the test signal, transmitted from the terminal equipment unit, back to the terminal equipment unit, without performing any processing. The terminal equipment unit measures a transmission delay time between the transmission timing of the test signal and reception timing of the test signal sent back from the central equipment unit, and adjusts the transmission timing of a data signal for the central equipment unit in accordance with the measured transmission delay time.

One transmission frame of the system includes a data transmission interval having time slots assigned to the respective terminal equipment units, and a window interval for measuring delay times. The window interval includes an address field for designating one of the terminal equipment units to transmit the test signal, and a test signal transmission/receiving field in which a terminal equipment unit transmits a test signal to the central equipment unit and receives the test signal sent back therefrom. Only the test signal transmission/reception field is used to transmit/receive the test signal for delay measurement, and the address field cannot be used therefor. For this reason, a time interval of a delay measurement window must be set relatively long, thus reducing the utility efficiency of time slots for data transmission. In addition, since each terminal equipment unit must receive a data signal transmitted from the central equipment unit and the test signal transmitted by itself, it is difficult to stably receive these signals. In other words, an expensive receiving device is required to ensure stable reception of the signals.

SUMMARY OF THE INVENTION

It is, therefore, an object of the present invention to provide a communication network system capable of improving the utility efficiency of time slots adapted for data transmission to terminal equipment units.

It is another object of the present invention to provide a communication network system which enables each terminal equipment unit to stably receive signals transmitted from a central equipment unit.

A communication network system according to the present invention comprises: a central equipment unit; a plurality of terminal equipment units, each of the terminal equipment units having at least one terminal device connected thereto; and a signal transmission line connected between the central equipment unit and the terminal equipment units, and having an up link and a down link. The central equipment unit comprises means for providing reference timings, and means for transmitting a frame signal, consisting of a delay measurement window field and a data field wherein subframe information signals are arranged on a time-division multiplexing basis, onto the down link, every time a reference timing arrives, the delay measurement window field of the frame signal having an address field carrying address information designating one of the terminal equipment units for a measurement of a delay time of a signal transmission between said central equipment unit and the terminal equipment unit. Each of the terminal equipment units comprises means for transmitting a response signal onto the up link, after a predetermined time interval from the reception timing of a frame signal, transmitted from the central equipment unit and having the address field carrying address information designating itself, such that the response signal arrives at the central equipment unit within the delay measurement window field of the next frame signal, the response signal carrying self address information. The central equipment unit further comprises means for measuring a delay time between the reference timing for transmitting the next frame signal and the reception timing of the response signal; and means for transmitting transmission timing adjustment information based on the measured delay time, and address information of the terminal equipment unit, which has transmitted the response signal, in the address field of the next frame signal. Each of the terminal equipment units further comprises means for transmitting a subframe signal after a time interval, depending on the transmission timing adjustment information, from the reception timing of a frame signal.

BRIEF DESCRIPTION OF THE DRAWINGS

FIG. 1 shows a communication network to which a signal transmission system of this invention is applied;

FIG. 2 is a diagram for explaining the signal transmission of the present invention;

FIG. 3 is a diagram for explaining a signal transmission according to the prior invention described above, for better understanding of the present invention;

FIG. 6 is a block diagram of the central equipment unit according to an embodiment of the present invention;

DETAILED DESCRIPTION OF THE PREFERRED EMBODIMENT

Figure 4:
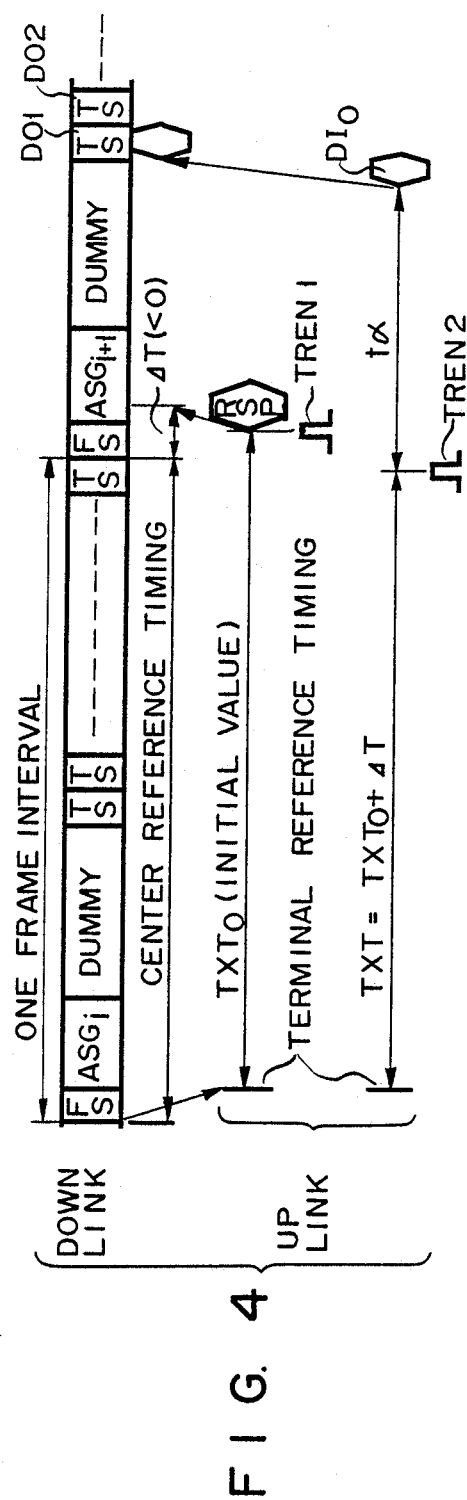
FIG. 4 is a diagram for explaining signal transmission timing adjustment of a terminal equipment unit according to the present invention.

A system for adjusting a signal transmission timing according to the present invention will now be described in detail with reference to a PBX network. As shown in FIG. 1, central equipment unit 1 including a PBX, and a plurality of terminal equipment units $2_1$, $2_2$, ..., $2_n$, each having concentration and distribution functions, are disposed at locations remote from one another. In this example, a bus-configured signal transmission line having up link 3 and down link 4 is extended from central equipment unit 1, and each terminal equipment unit is connected at a different position on the signal transmission line. Therefore, a signal transmission time between each terminal equipment unit and central equipment unit 1 depends on a position where the terminal equipment unit is connected to the signal transmission line. To each terminal equipment unit is connected at least one terminal device 5 such as a telephone set or a data processing device. The number of terminal devices 5 connected to a terminal equipment unit need not be constant.

The terminal equipment units are assigned with numbers (addresses) #1, #2, ..., #i, ..., #n. Central equipment unit 1 transmits subframe data signals addressed to the respective terminal equipment units over down link 4 on a time-division multiplexing basis within one frame interval, and the respective terminal equipment units sequentially transmit subframe data signals to central equipment unit 1 over up link 3. The signal transmission line may be a frequency multiplex transmission line in which the up link and the down link are adapted for different transmission frequency bands, or two separate transmission lines may be used for signal transmission in the same transmission frequency band.

An example of a signal transmission system according to the present invention will be described below with reference to FIG. 2. With a communication network system of the present invention, one of the terminal equipment units is designated every frame interval, and the designated terminal equipment unit transmits a response signal to the central equipment unit. The central equipment unit measures a time (transmission delay time) between a reference timing in one frame interval and a receiving timing of the response signal transmitted from the terminal equipment unit, and transmits measured data to the terminal equipment unit, so that the terminal equipment unit adjusts a transmission start timing of a data signal (subframe signal) for the central equipment unit.

An example of a format of a frame signal transmitted from the central equipment unit to each terminal equipment unit over the down link is shown in FIG. 2. The format includes a field of a frame sync signal (FS) or a frame delimiter, a field of an assignment signal (ASGi) including address information for designating a terminal equipment unit having an address number i or an address field, a dummy data field, and a data field including subframe signals D01, D02, ..., D0n addressed to the respective terminal equipment units $2_1$, $2_2$, ..., $2_n$. In the next frame signal, an assignment signal (AS- Gi+1) for designating a terminal equipment unit having an address number i+1 is transmitted. The subframe signal is transmitted in a time slot (TS) assigned to the corresponding terminal equipment unit. As shown in FIG. 2, the frame signals may be continuously transmitted from the central equipment unit to the respective terminal equipment units via the down link. According to the present invention, the FS field, the ASG field, and the dummy data field are adapted for a window for measuring the transmission delay times.

Over the up link, response signal RSPi-1 is transmitted from the terminal equipment unit having address number i-1 and designated by signal ASGi-1 in the previous frame signal, and then subframe data signals DI1, DI2, . . . , DIn are transmitted from the respective terminal equipment units. These subframe data signals are transmitted in time slots assigned to the respective terminal equipment units. A response signal, following signal RSPi-1, is RSPi transmitted from a terminal equipment unit having address number i and designated by signal ASGi. Signal RSPi-1 is only required to reach the central equipment unit within a delay measurement window of a frame signal carrying ASGi signal. A timing at which a response signal reaches the central equipment unit within the delay measurement window depends on the position of a terminal equipment unit transmitted the response signal.

For better understanding of advantages of the transmission system according to the present invention, the transmission system according to the above-mentioned prior invention will be described below with reference to FIG. 3. According to this system, each terminal equipment unit measures a transmission delay time. A terminal equipment unit designated by signal ASGi transmitted from the central equipment unit transmits signal RSPi to the central equipment unit via the up link, and receives signal RSPi sent back from the central equipment unit via the down link. In order for the terminal equipment unit to transmit and receive signal RSPi without a collision with a data signal transmitted from another terminal equipment unit, the delay measurement window adapted for transmitting and receiving signal RSPi is limited within an interval between the ASGi field and the data field, as shown in FIG. 3. Therefore, since a time interval which cannot be used for the delay measurement increases as compared with the system according to the present invention, it is difficult to increase time slots used for data signal transmissions. As a result, the utility efficiency of the time slots is reduced.

A transmission system according to the present invention will be described below with reference to FIG. 4.

In FIG. 4, a transmission initiation timing of a frame signal, e.g., the frame sync signal, is set to a reference timing of the central equipment unit. The frame signal reaches terminal equipment unit 2i, having address i, via the down link with a certain delay time. The terminal equipment unit generates a first TRANSMIT ENABLE signal TREN1 to transmit the RSP signal after a predetermined period TXTo of time, which substantially corresponds to a frame interval, from a reception start timing (reference timing of the terminal equipment unit) of the frame signal. The RSP signal is transmitted to the central equipment unit over the up link, and the central equipment unit measures a time difference $\Delta T$ ($<0$) between the next frame reference timing and a reception timing of the RSP signal. The central equipment unit corrects transmission timing information for the terminal equipment unit as $TXT = TXTo + \Delta T$ in accordance with the measured time information, and transmits the corrected transmission timing information to the terminal equipment unit. The terminal equipment unit generates a TRANSMIT ENABLE signal TREN2 after a delay of time TXT from the reference timing. When the RSP signal is transmitted at the timing when signal TREN2 is generated, the RSP signal arrives at the central equipment unit at the reference timing of the next frame. The RSP signal need not be transmitted in response to signal TREN2, and a generation timing of signal TREN2 is utilized as a reference timing for the corresponding terminal equipment unit to transmit the subframe signal to the central equipment unit. That is, when a subframe data signal DI is transmitted after a delay of time $t\alpha$ from the generation timing of signal TREN2, signal DI arrives at the central equipment unit in the time slot assigned to the corresponding terminal equipment unit within one frame interval. Time $t\alpha$ is represented by $t\alpha = Ts \times i + \alpha$, where Ts is a time slot length; i is an assigned time slot number (address number); and $\alpha$ is a time interval from the reference timing of the central equipment unit to the first time slot.

Figure 5B:
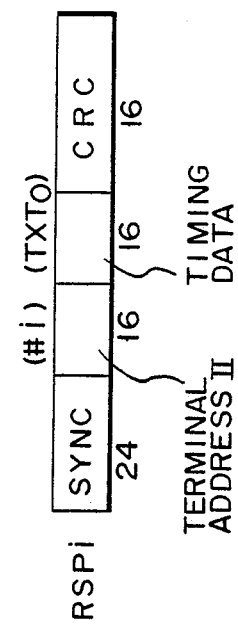
FIGS. 5A and 5B show, by way of examples, formats of an ASG signal transmitted from a central equipment unit to terminal equipment units and an RSP signal transmitted from a terminal equipment unit to the central equipment unit, respectively.
Figure 5A:
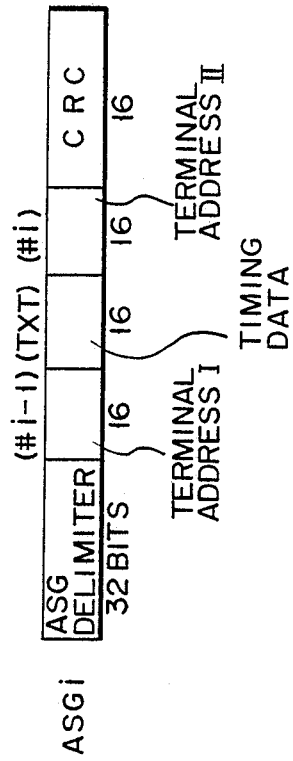

FIGS. 5A and 5B respectively show examples of formats of signal ASGi for requesting the terminal equipment unit 2i to transmit the response signal, and response signal RSPi transmitted from the terminal equipment unit 2i. As shown in FIG. 5A, signal ASGi includes an ASG delimiter (32 bits), address information I (i-1, 16 bits) of the terminal equipment unit 2i-1 which has already transmitted response signal RSPi-1, corrected transmission timing control information (TXT, 16 bits) for the terminal equipment unit 2i-1, address information II (i, 16 bits) of the terminal equipment unit 2i which is requested to transmit the response signal, and error detection signal CRC (16 bits). Signal RSPi includes a sync signal (24 bits), address information (i, 16 bits) representing a source of signal RSPi, transmission timing information (TXTo, 16 bits), and error detection signal CRC (16 bits).

An arrangement of central equipment unit 1 will be described below with reference to FIG. 6.

Diplexer 61 is provided, which applies a received signal, transmitted from the terminal equipment units over up link 3, to demodulator 62. Demodulator 62 demodulates the received signal and forms a carrier sense signal CS. The demodulated signal is applied to frame disassembler 63, delay measurement module 64, and ASG/RSP processing module 65. Carrier sense signal CS is applied to frame disassembler 63 and delay measurement module 64.

Frame disassembler 63 disassembles the subframe signal transmitted from a terminal equipment unit and included in the demodulated signal, and supplies audio PCM data and control data to PBX 66, respectively, through a PCM highway (HW) and a data highway (HW). PBX 66 performs exchange processing of data signals transmitted from the terminal equipment units, and supplies audio PCM data and control data to frame assembler 67, respectively, through PCM HW and data HW. PBX 66 supplies 2.048-MHz PCM clock signal PCM CLK and a PCM HW frame sync signal to clock generator 68 which generates master clock $\phi 1$ (4.096 MHz), delay measurement clock $\phi 2$ (65.536 MHz), and a sequencer master count outputs (0 to 7FFF H) synchronous with clock $\phi 2$. These clock signals and timing signals are applied to various circuits of central equipment unit 1, as shown in FIG. 6.

Frame assembler 67 assembles PCM data (3 bits) and control data (1 bit), supplied from PBX 66 and addressed to one terminal equipment unit, into a subframe data signal for a time slot assigned to the terminal equipment unit, and sends the subframe data signal to selector/CRC generator 69. Selector 69 selects subframe signals generated by assembler 67 and ASG signal (including the frame sync signal and dummy data) generated by module 65 in accordance with the format of the frame signal shown in FIG. 2 for application to modulator 70. Like outputs of assembler 67 and module 65, an output of selector 69 has 2 bits. This is because an output signal of selector 69 is subjected to quadrature phase shift keying in modulator 70.

In response to the demodulated data signal and carrier sense signal CS supplied from demodulator 62, delay measurement module 64 generates information $\Delta T$ which represents a time difference between the transmission start timing of the frame signal and the reception timing of the RSP signal, clock signal RSP CLK (4.096 MHz) recovered from the demodulated RSP signal, and an RSP nondetection signal which represents that the RSP signal could not be detected within a predetermined interval, these signals being applied to AGS/RSP processing module 65. Module 65 generates signal ASGi in the format consisting of fields from the ASG delimiter to terminal address II, as shown in FIG. 5A. The CRC signal is generated in generator 69 and added subsequent to the field of terminal address II of signal ASGi. As shown in FIG. 2, the CRC signal is generated based on signals existing from the dummy data field of one frame signal to the field of terminal address II in the ASG signal of the next frame signal.

Figure 7:
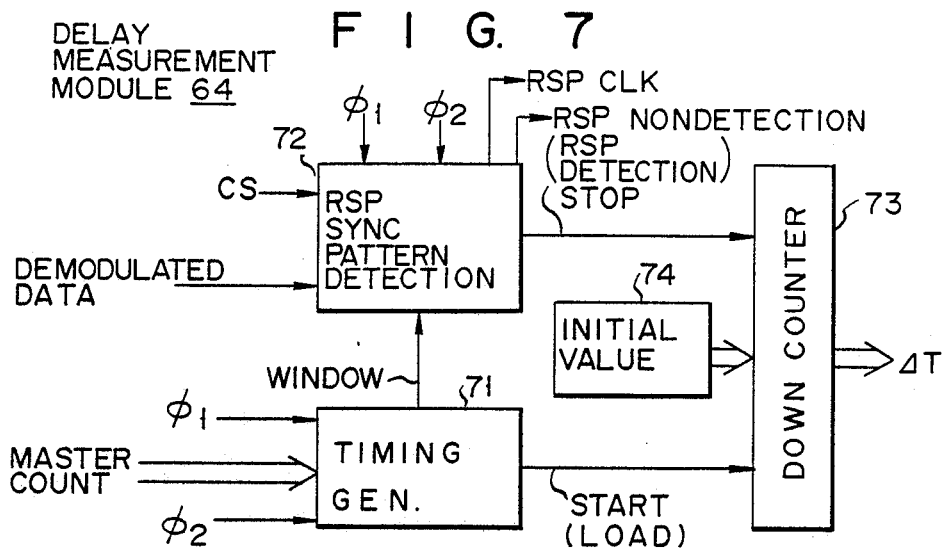
FIG. 7 is a block diagram of a delay measurement module of FIG. 6.

As shown in FIG. 7, delay measurement module 64 includes timing generator 71, RSP sync pattern detector 72, down counter 73, and register 74 into which an initial value of delay measurement information is preset.

In response to master clock $\phi 1$, delay measurement clock $\phi 2$, and the master count output, timing generator 71 supplies a delay measurement start signal (load instruction) to down counter 73 so that the initial value of register 74 is loaded into down counter 73. Timing generator 71 generates an RSP detection window signal at a timing when the RSP signal is likely to be received and supplies it to RSP sync pattern detector 72. Detector 72 is set ready for detecting RSP signal by the window signal, and responsive to carrier sense signal CS and the demodulated data signal supplied from demodulator 62 to detect the RSP signal. Upon detection of the RSP signal, detector 72 supplies a count stop signal to counter 73. In addition to the detection of the RSP signal, detector 72 recovers clock signal RSP CLK from the RSP signal, and generates the RSP nondetection signal when the RSP signal is not detected.

In response to the start signal obtained from timing generator 71 which coincides with a transmission start timing of one frame signal in central equipment unit 1, down counter 73 starts a down count. In response to the stop signal obtained from RSP sync pattern detector 72 which coincides with the RSP signal detection timing, counter 73 stops the down count. The count of counter 73, obtained when the down count is stopped, represents a time difference $\Delta T$ between the transmission start timing (reference timing) of the frame signal and the RSP signal reception (detection) timing (FIG. 4).

Figure 8:
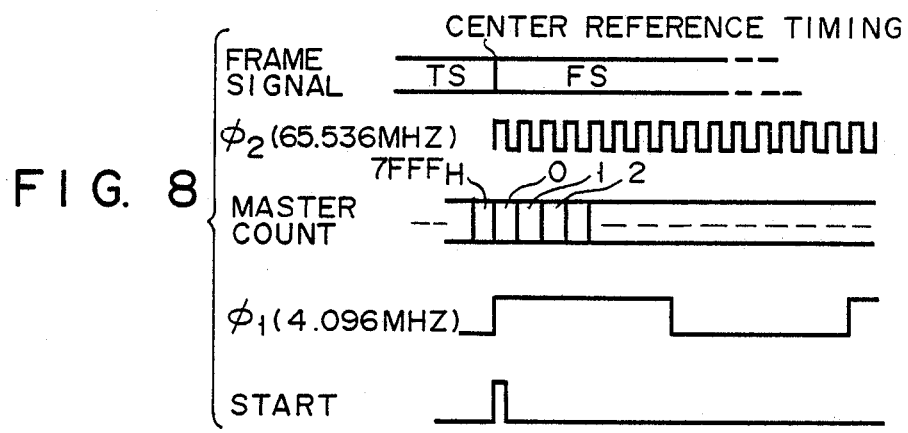
FIG. 8 is a diagram for explaining a reference timing used in the central equipment unit.

As shown in FIG. 8, the reference timing of central equipment 1, i.e., the down count start timing of down counter 73 is set to the timing when the master count, indicating a count from 0 to $7FFF_H$, indicates 0, and the start signal for down counter 73 is generated at this timing. At the same time, a frame signal transmission is started from the frame sync signal FS.

Figure 9:
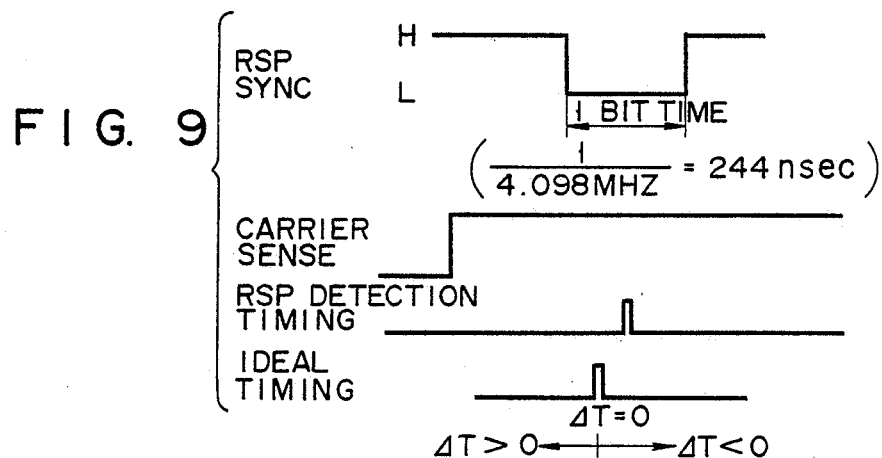
FIG. 9 is a diagram for explaining a transmission (detection) timing of the RSP signal transmitted from a terminal equipment unit.

The RSP signal detection will be described below with reference to FIG. 9.

The RSP signal sync field shown in FIG. 5A has a pattern which remains low during one bit time (=1/4.098 MHz=244 nsec). RSP sync pattern detector 72 detects whether an output signal of demodulator 62 remains low during a period of eight clocks of delay measurement clock $\phi 2$ (4.098 MHz×16) after carrier sense signal CS is applied. If this is detected, an RSP detection pulse is generated after a delay of $\frac{1}{2}$ bit time from a transition of the sync pattern from a high level to a low level. The initial value set in the register 74 shown in FIG. 7 is determined such that the RSP signal is detected at an ideal timing, which may be arbitrarily set, e.g., a timing around the front portion of the ASG field of a frame signal which is being transmitted from central equipment unit 1. Therefore, when the RSP signal is detected at the ideal timing, $\Delta T=0$. When the RSP signal is detected after the ideal timing, $\Delta T<0$, and when the RSP signal is detected before the ideal timing, $\Delta T>0$.

Figure 10:
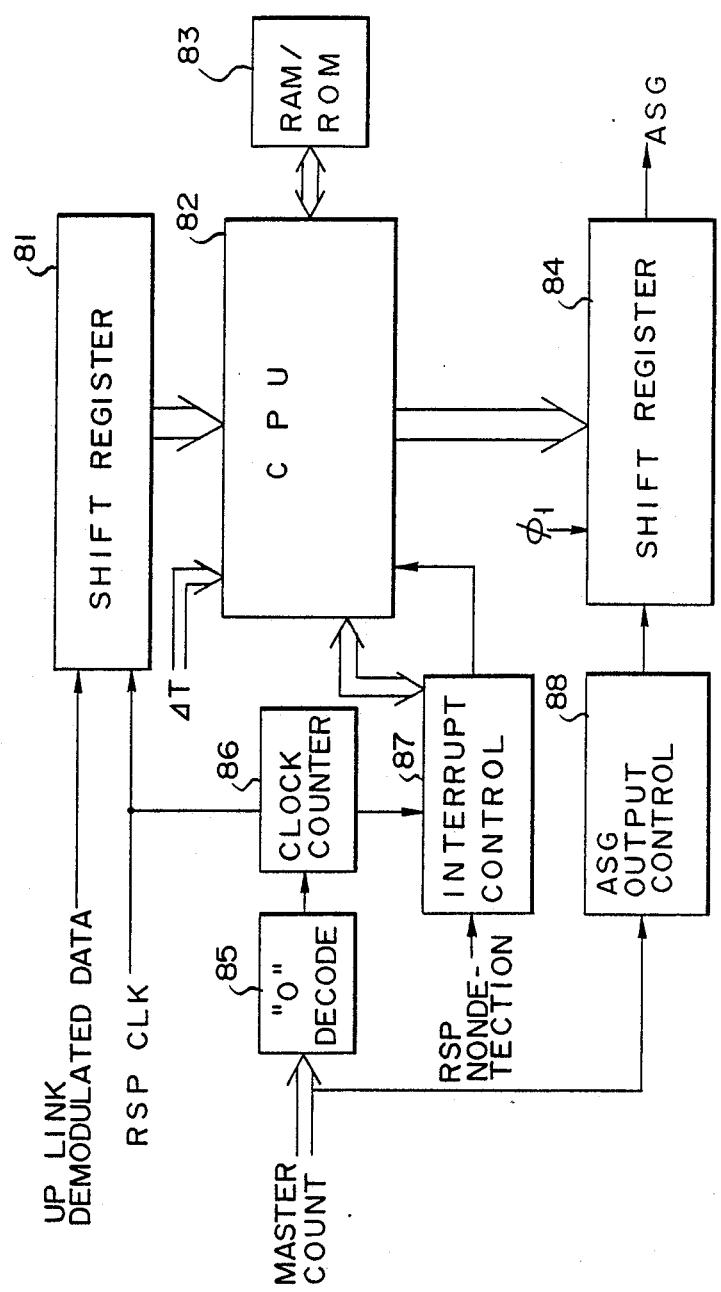
FIG. 10 is a block diagram of an ASG/RSP processing module of FIG. 6.

ASG/RSP processing module 65 will be described below with reference to FIG. 10.

Module 65 includes serial to parallel conversion siift register 81, central processing unit (CPU) 82, RAM/ROM 83 for storing data and CPU programs, parallel to serial conversion shift register 84, decoder 85, clock counter 86, interrupt controller (counter/timer controller) 87, and ASG output controller 88.

Shift register 81 receives a demodulated signal from demodulator 62 in response to clock RSP CLK. More specifically, register 81 is adapted to receive the RSP signal sync field, the terminal address field, and the timing data field hown in FIG. 5B. Decoder 85 decodes "0" of the master count to reset counter 86. Counter 86 counts clock RSP CLK. When the desired data fields are loaded into register 81, counter 86 instructs controller 87 to cause CPU 82 to receive the data from register 81. CPU 82 receives timing information TXTo transmitted from a terminal equipment unit, and information $\Delta T$ provided from module 64 to calculate $TXT=TXTo+\Delta T$. In addition, CPU 82 assembles the ASG delimiter field, the terminal address field (#i-1), the timing data field (TXT), and the terminal address field (#i) as shown in FIG. 5A, following frame sync field FS. The terminal address field (#i-1) and the timing data field (TXT) are adapted to inform the terminal equipment unit having address number i-1 of the corrected transmission timing information $TXT=TXTo+\Delta T$. The terminal address field (#i) is adapted to poll the terminal equipment unit having address i for the purpose of measuring a transmission delay time. CPU 82 loads such assembled data into register 84. Controllr 88 supplies the data loaded in register 84, in response to the master count "0", to selector/CRC generator 69 for transmission to the terminal equipment units.

Figure 11:
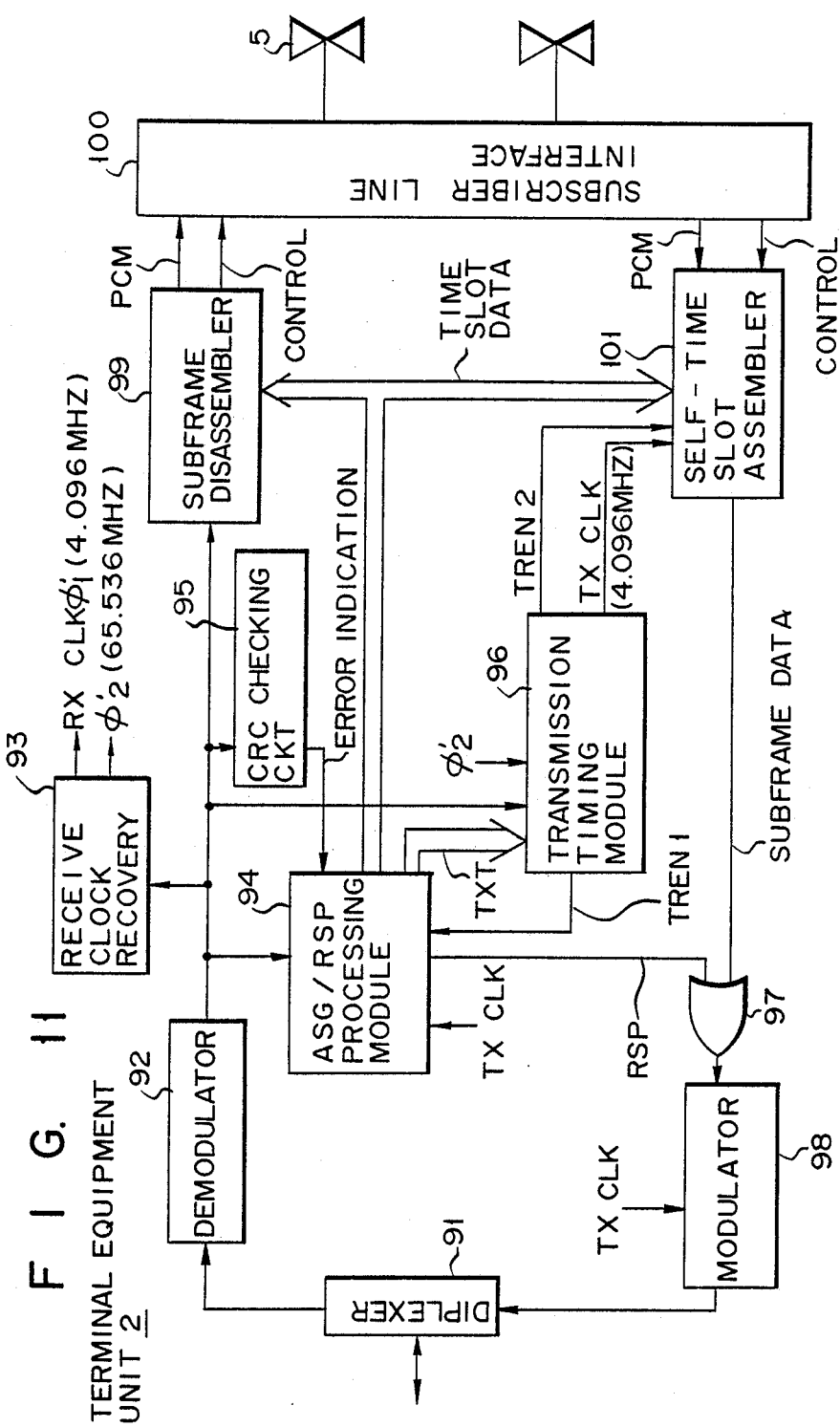
FIG. 11 is a block diagram of the terminal equipment unit.

An arrangement of a terminal equipment unit will be described with reference to FIG. 11.

Diplexer 91 is connected to the signal transmission line and applies a frame signal transmitted from central equipment unit 1 to demodulator 92. A demodulated data signal is applied to receive clock recovery circuit 93 where 4.096-MHz receive clock ϕ1' is recovered from the demodulated data signal and frequency-multiplied by a factor of 16 to generate 65.536-MHz transmission timing adjustment clock ϕ2'.

The demodulated data signal is also applied to ASG/RSP processing module 94 and CRC checking circuit 95. Module 94 detects polling address information II, addressed to itself and included in the ASG signal, so as to generate the RSP signal, and extracts timing adjustment information TXT addressed to itself from the ASG signal after the delay time measurement. CRC checking circuit 95 checks the CRC signal included in the ASG signal. If an error is detected, circuit 95 generates an error indication signal to disable ASG/RSP processing module 94.

Transmission timing module 96 receives the demodulated data signal, transmission timing adjusting clock ϕ2', and transmission timing information TXT extracted by module 94 and generates transmission enable signals TREN1 and TREN2 shown in FIG. 4, and 4.096-MHz transmission clock TX CLK. In response to signal TREN1 and clock TX CLK, module 94 outputs the RSP signal for the delay time measurement after a delay of time TXTo from the detection timing of the frame signal. The RSP signal is supplied to modulator 98 through OR gate 97 and a modulated signal is applied to diplexer 91 for transmission to central equipment unit 1 over up link 3.

The demodulated output signal of demodulator 92 is applied to subframe disassembler 99. In response to the time slot data corresponding to the self address provided by module 94, disassembler 99 disassembles the subframe data addressed to itself from central equipment unit 1, and supplies audio PCM data and control data such as a ringing control signal for terminal device 5 to subscriber line interface 100. Interface 100 supplies audio PCM data and control data such as a hook/dial pulse generated by device 5 to self-time slot assembler 101. Assembler 101 is responsive to the time-slot data supplied from module 94, signal TREN2 supplied from module 96, and clock TX CLK to apply a subframe data signal, in a time slot assigned to itself, to modulator 98 through OR gate 97. The subframe data signal is modulated and applied to diplexer 91 for transmission over up link 3. The timing at which the subframe data signal is output from assembler 101 follows the timing at which signal TREN2 is generated by module 96 for $t\alpha = T - s \times i + \Delta$. Assembler 101 counts clocks TX CLK for a predetermined number corresponding to $t\alpha$ in response to signal TREN2, and outputs the subframe signal when counting the predetermined number of clocks TX CLK.

Figure 12:
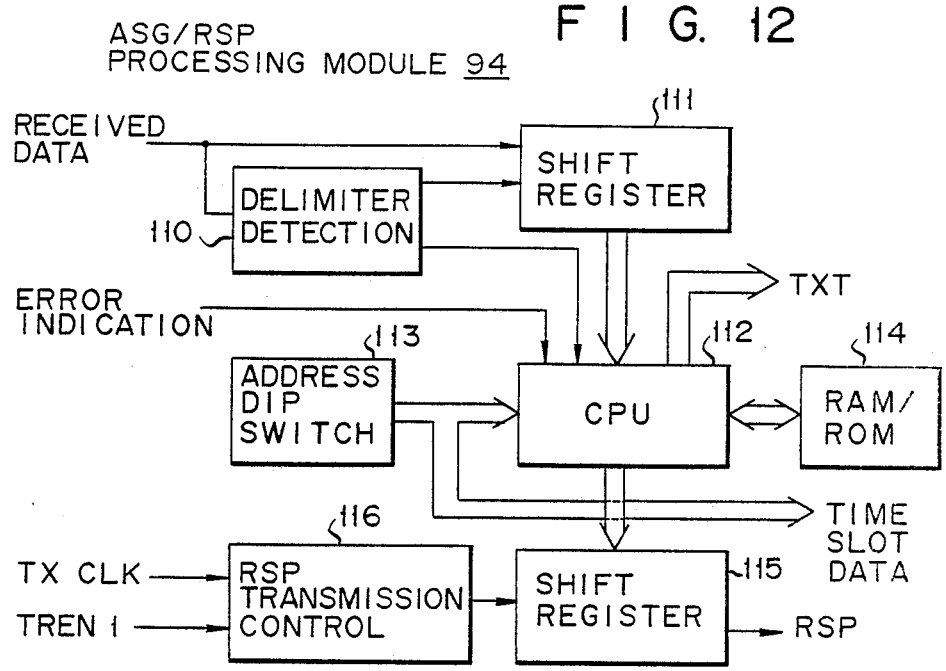
FIG. 12 is a block diagram of the ASG/RSP processing module of FIG. 10.

FIG. 12 shows ASG/RSP processing module 94. Delimiter detector 110 detects an ASG delimiter signal from demodulated data signal supplied from demodulator 92. When the ASG delimiter signal is detected, detector 110 enables shift register 111 to receive address information I, timing information TXT, and address information II contained in the ASG signal. When the above information is loaded into register 111, detector 110 causes CPU 112 to receive the contents of register 111. To CPU 112 is applied the address information of the self terminal equipment unit provided by address dip switches 113. CPU 112 is programmed by ROM 114 and detects whether or not the address information supplied from register 111 is the self address. When address information I (#i-1) is the self address, CPU 112 supplies timing information TXT to module 96. On the other hand, when address information II (#i) is the self address, CPU 112 generates the RSP signal and loads it into shift register 115. In response to clock TX CLK and signal TREN1, RSP transmission controller 116 starts the transmission of the RSP signal stored in register 115 at the the generation timing of signal TREN1.

Figure 13:
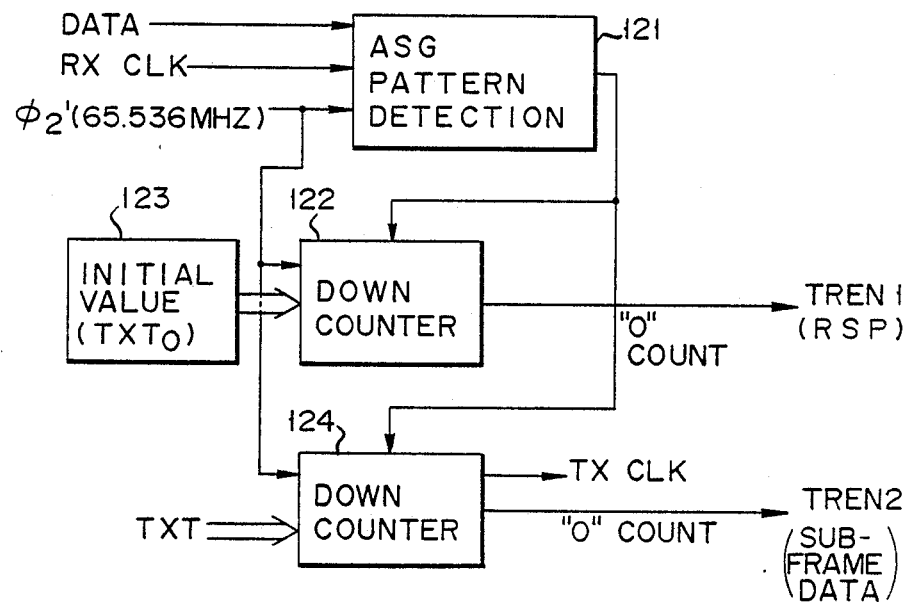
FIG. 13 is a block diagram of a transmission timing module of FIG. 10.

FIG. 13 shows an arrangement of transmission timing module 96. A low level period of one bit time is present at a predetermined position of frame sync signal FS of the frame signal transmitted from central equipment unit 1. ASG pattern detector 121 detects the predetermined pattern of the frame sync signal in response to the demodulated data signal, clock RX CLK, and clock ϕ2'. The detection timing of the predetermined pattern provides the reference timing of the terminal equipment unit. Upon detecting the predetermined pattern, initial value TXTo preset in register 123 is loaded into down counter 122, and timing adjustment information TXT provided from module 94 is loaded into down counter 124. Counters 122 and 124 are counted down by transmission timing adjusting clock ϕ2'. When counted down to 0, counter 122 generates RSP signal transmission enable signal TREN1. When counted down to 0, counter 124 generates subframe (time slot) data transmission enable signal TREN2. Counter 124 may be arranged to generate transmission clock TX CLK.

As described above, according to the present invention, the central equipment unit transmits the ASG signal to the terminal equipment units, and each terminal equipment unit transmits the RSP signal to the central equipment unit in response to the ASG signal addressed thereto. That is, unlike the prior invention described above, each terminal equipment unit is not required to receive a signal which has been transmitted by itself and then sent back from the central equipment unit as it is, but is only required to receive signals generated by the central equipment unit. Thus each terminal equipment unit can stably receive signals. Therefore, a demodulator may be simple in construction.

The present invention is not limited to the above embodiment. The description has been made of the case wherein a predetermined time slot is fixedly assigned to a terminal equipment unit. The system of the present invention may be applied to a demand assign system in which each terminal equipment unit demands a time slot, and the central equipment unit assigns time slots to the terminal equipment units on demand. In the case of the demand assign system, it is required that the RSP signal be transmitted in response to transmission enable signal TREN2 after the measurement of a delay time. By doing so, the RSP signal arrives at the central equipment unit at a predetermined timing of one frame interval. This increases the flexibility of a frame arrangement. In addition, the formats of the ASG and RSP signals are not limited to those shown in FIGS. 5A and 5B. The ASG and RSP signals may include control information as needed. In the case of the demand assign system, the control information may carry information of a time slot assigned to a terminal equipment unit on demand. In this case, the timing $t\alpha$ at which each terminal equipment unit transmits a subframe signal varies in accordance with the time slot information.

In the above embodiment, the central equipment unit calculates transmission timing data $TXT = TXTo + \Delta T$ in accordance with delay measured data $\Delta T$ and transmits it to the corresponding terminal equipment unit. Alternatively, the central equipment unit may transmit delay measured data ΔT to the corresponding terminal equipment unit, and this terminal equipment unit may calculate $TXT = TXT_0 + \Delta T$ for adjusting the transmission timing thereof.

What is claimed is:

1. A communication network system comprising:
   a central equipment unit;
   a plurality of terminal equipment units, each having at least one terminal device connected thereto; and
   a signal transmission line connected between said central equipment unit and said terminal equipment units, and having an up link and a down link,
   said central equipment unit comprising means for providing periodical reference timings; and means for transmitting a frame signal, consisting of a delay measurement window field and a data field wherein subframe information signals are arranged on a time-division multiplexing basis, onto said down link each time the reference timing arrives, the delay measurement window field of the frame signal having an address field carrying address information designating one of said terminal equipment units for a measurement of a delay time of a signal transmission between said central equipment unit and the terminal equipment unit;
   each of said terminal equipment units comprising means for transmitting a response signal onto said up link, after a delay of a predetermined time interval from the reception timing of the frame signal, transmitted from said central equipment unit and having the address field carrying address information designating itself, such that the response signal arrives at said central equipment unit within the delay measurement window field of the next frame signal, the response signal carrying self address information;
   said central equipment unit further comprising means for measuring a delay time between the reference timing for transmitting the next frame signal and the reception timing of the response signal; and means for transmitting transmission timing adjustment information based on the measured delay time, and address information of said terminal equipment unit, which has transmitted the response signal, in the address field of the next frame signal; and
   each of said terminal equipment units further comprising means for transmitting a subframe signal after a time interval, depending on the transmission timing adjustment information, from the reception timing of a frame signal.

2. A network according to claim 1, wherein said central equipment unit continuously transmits the frame signals.

3. A network according to claim 1, wherein the delay measurement window field has a frame sync signal field, an address field, and a dummy data field.

4. A network according to claim 1, wherein the address field of the frame signal carries first address information for designating one of said terminal equipment units to measure the delay time, second address information representing an address of a terminal equipment unit which has undergone the delay time measurement, and transmission timing adjustment information based on a result of the delay time measurement of said terminal equipment unit.

5. A network according to claim 1, wherein the response signal carries information indicative of a time from the reception timing of a frame signal to the transmission timing of the response signal, as well as the self address information.

6. In a communication network comprising: a central equipment unit; a plurality of terminal equipment units, each of said terminal equipment units having at least one terminal device connected thereto; and a signal transmission line connected between said central equipment unit and said terminal equipment units, said signal transmission line having an up link and a down link; said central equipment unit transmitting subframe signals to said terminal equipment units, over said down link, on a time-division multiplexing basis, within one frame interval, and said terminal equipment units transmitting subframe signals to said central equipment unit, over said up link,
   a method of adjusting signal transmission timings of said terminal equipment units, for preventing a collision of subframe signals transmitted from said terminal equipment units on said up link, said method comprising the steps of:
   periodically generating reference timings in said central equipment unit;
   transmitting a frame signal from said central equipment unit to said terminal equipment units, over said down link, in response to each of the reference timings, the frame signal consisting of a delay measurement window field and a data field wherein the subframe signals addressed to said terminal equipment units are arranged on a time-division multiplexing basis, and the delay measurement window field having an address field carrying address information designating one of said terminal equipment units for delay time measurement;
   transmitting, from each of said terminal equipment units, a response signal onto said up link, after a delay of a predetermined time interval from the reception timing of the frame signal transmitted from said central equipment unit and having an address field carrying address information designating the self terminal equipment unit, such that the response signal arrives at said central equipment unit within a delay measurement window field of the next frame signal, the response signal carrying the self address information;
   measuring, in said central equipment unit, a delay time between the reference timing for transmitting the next frame signal and the reception timing of the response signal transmitted from said terminal equipment unit;
   transmitting, from said central equipment unit to a terminal equipment unit which has transmitted the response signal, transmission timing adjustment information based on the measured delay time, and address information of said terminal equipment unit which has transmitted the response signal, in the address field of the next frame signal; and
   transmitting, from each of said terminal equipment units, a subframe signal onto said up link, after a delay of a time interval, depending on the transmission timing adjustment information transmitted from said central equipment unit, from the reception timing of the frame signal.

7. A method according to claim 6, wherein the frame signals are continuously transmitted from said central equipment unit to said terminal equipment units, over said down link.

8. A method according to claim 6, wherein the delay measurement window field has a frame sync signal field, an address field, and a dummy data field.

9. A method according to claim 6, wherein the address field of the frame signal carries first address information for designating one of said terminal equipment units to measure the delay time, second address information representing an address of said terminal equipment unit which has undergone the delay time measurement, and transmission timing adjustment information based on a result of the delay time measurement of said terminal equipment unit.

10. A method according to claim 6, wherein the response signal carries information indicative of a time from the reception timing of a frame signal to the transmission timing of the response signal, as well as the self address information.

* * * * *